No. 732,626. PATENTED JUNE 30, 1903.
W. H. FOX.
COMBINATION ADJUSTABLE PLOW AND CULTIVATOR.
APPLICATION FILED JUNE 16, 1902.
NO MODEL. 2 SHEETS—SHEET 1.
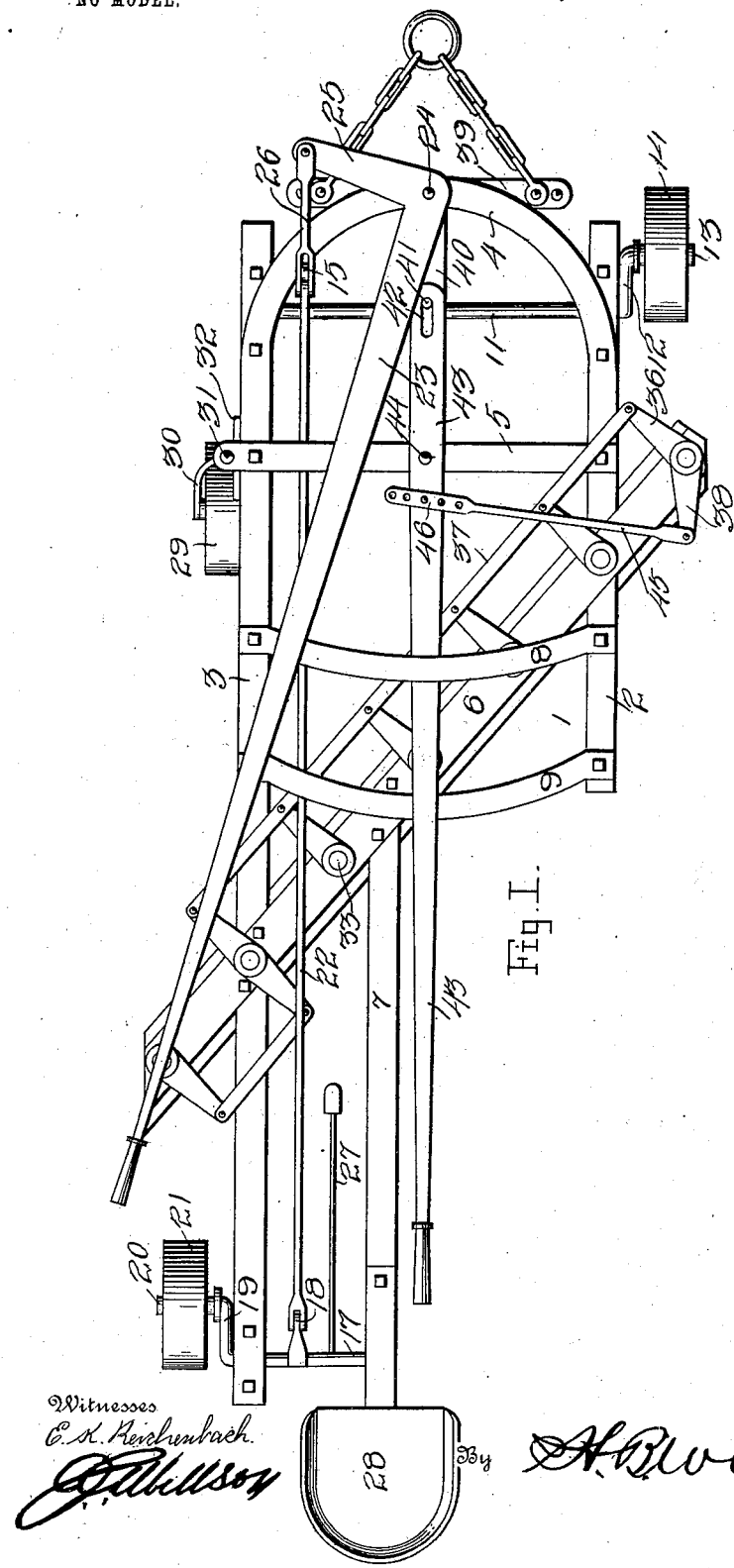
Fig. I.
Witnesses
E. K. Reichenbach
J. Willson
Inventor
W. H. Fox.
By H. B. Willson,
Attorney

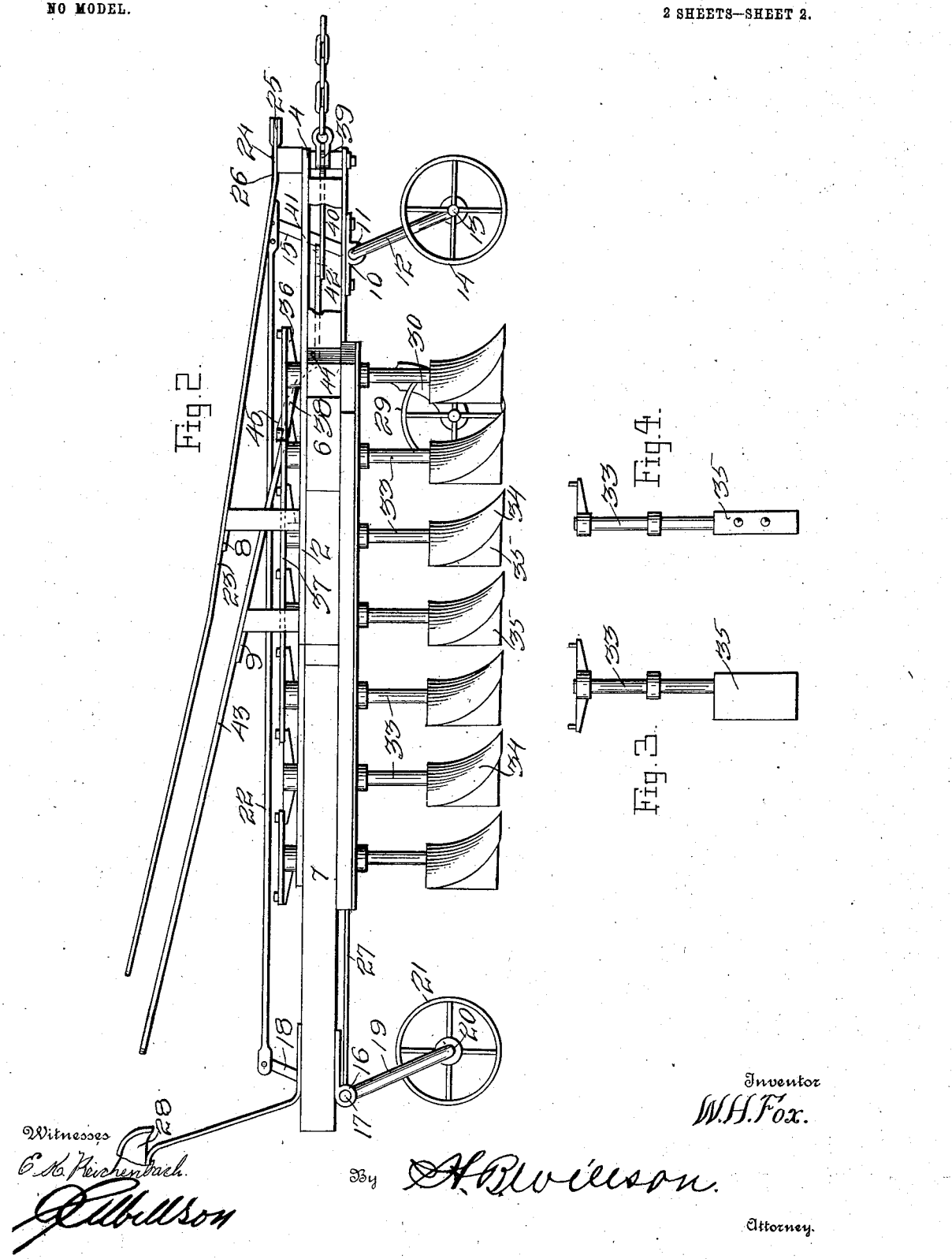

No. 732,626. Patented June 30, 1903.

UNITED STATES PATENT OFFICE.

WILLIAM H. FOX, OF GILROY, CALIFORNIA.

COMBINATION ADJUSTABLE PLOW AND CULTIVATOR.

SPECIFICATION forming part of Letters Patent No. 732,626, dated June 30, 1903.

Application filed June 16, 1902. Serial No. 111,885. (No model.)

*To all whom it may concern:*

Be it known that I, WILLIAM H. FOX, a citizen of the United States, residing at Gilroy, county of Santa Clara, State of California, have invented a new and useful Combined Adjustable Plow and Cultivator; and I declare the following to be a full, clear, and exact description of the same.

My invention relates to improvements in adjustable plows and cultivators; and it consists in the construction and combination of devices hereinafter described and claimed.

In the accompanying drawings, Figure 1 is a top plan view of an adjustable plow and cultivator embodying my improvements. Fig. 2 is a side elevation of the same. Figs. 3 and 4 are detail views of the plows, their standards, and the arms by which they may be turned.

In the embodiment of my invention I provide a frame 1, which may be of any suitable construction. The same is here shown as comprising a pair of longitudinally-disposed side bars 2 3, appropriately spaced apart, and the former shorter than the latter and disposed abreast of the front portion thereof, a pair of substantially U-shaped yokes 4, which connect the front portion of said bars 2 3 together and are bolted on their upper and lower sides, and cross-bar 5, which connects said bars 2 3 together at a suitable distance from their front ends, and beam 6, which is disposed obliquely with reference to said bars 2 3 and is secured thereto, and a rearwardly-extending bar 7, which has its front end securely attached to the beam 6, near the center of the latter. The length of the beam 6 is such that its ends project beyond the outer sides of the bars 2 3. Said bars 2 3 are further connected together at suitable points above the beam 6 by arch-bars 8 9, which are disposed the former in advance of the latter, and said arch-bars are curved, as shown in Fig. 1, and in practice may be provided with rack-teeth for the purpose hereinafter stated.

On the under sides of the bars 2 3, near the front end thereof, are bearings 10, in which is journaled an axle-shaft 11, which is provided at its right-hand end with an arm 12, that extends at right angles thereto, or substantially so, which arm has a spindle 13 at its outer end, said spindle carrying a front supporting-wheel 14, as shown. The said axle-shaft is further provided with an upwardly-extending rock-arm 15.

The bars 3 7 are provided near their rear ends on their lower sides with bearings 16 for an axle-shaft 17, which has an upwardly-extending rock-arm 18 and is provided at its left-hand end with an arm 19, which has a spindle 20, on which is a rear supporting-wheel 21. The arms 15 18 are connected together by a rod 22.

A lever 23 is pivoted at its front end, as at 24, at a point coincident with the central portion of the yokes 4 and has an arm 25, which is connected by a link 26 to the said rod 22. It will be understood that by moving this lever laterally the link 26, rock-arms 15 18, and rod 22 will cause the axle-shafts to partly turn in their bearings to impart angular vertical movement to their arms, which carry the wheels 14 21, and hence the frame will be raised or lowered, according to the direction in which said lever 23 is moved. Said lever bears on the arch-bar 8 and in practice is provided with a suitable locking-dog to coact with said arch-bar to lock said lever at any desired adjustment.

To facilitate the vertical adjustment of the frame 1 and the plows or cultivators which it carries, I further provide pedal-lever 27, on which the driver, seated on seat 28, may place one of his feet, the said pedal-lever being adapted to be operated by the driver simultaneously with the lever 23. Said pedal-lever is directly attached to the axle-shaft 17, which carries the rear supporting-wheel 21.

A third wheel 29, which is a trail-wheel, is carried by a fork 30, having a shank 31, which is mounted in suitable bearings 32 and is movable vertically in the said bearings to admit of the vertical adjustment of the frame 1 in the manner and by the means hereinbefore described independently of said trail-wheel.

The obliquely-disposed beam 6 is provided with bearings for the vertical standards 33 of a suitable number of plows or cultivator-points 34. The said standards are also provided at their lower ends with landside-pieces 35, which are adapted to be angularly disposed with reference to the line of draft by suitably turning the standards 33, thus enabling the cultivators or plows to be so set as to overcome side draft and to enable the machine to be employed for sidehill plowing as well as for plowing level land. It will be furthermore understood that by appropriately adjusting the plows or cultivators the machine may be caused to move laterally in either direction while being drawn forwardly, so as to cause it to operate close to trees and the like and also enable it to be readily guided to avoid obstructions. Each of the standards 33 is provided at its upper end with a rock-arm 36, forming, in effect, a tiller. The said rock-arms or tillers are connected together by connecting-rods 37, which cause them to move in unison, and one of the said standards 33 is further provided with a rock-arm 38.

A draft-head 39, which may be of any suitable construction, is pivotally mounted at the front end of the frame, either as here shown by the pivot 24 of the lever or by other suitable means, and said draft-head has a centrally-disposed rearwardly-extending arm 40. The latter has near its rear end a pivot 41, which operates in a slot 42 in the front end of a lever 43, which lever extends rearwardly to within convenient reach of the driver on the seat 28 and is fulcrumed, as at 44, on the cross-bar 5 and is connected by the rod 45 to the arm 38, which forms the adjusting arm or element of the plurality of simultaneously-adjustable plows or cultivators. This rod 45 is adjustably connected, as at 46, to the lever 23. It will be understood that by means of said lever and its connections the plows or cultivors may be simultaneously adjusted as may be required and that the draft head or element 39 will also be simultaneously adjusted.

The lever 43 operates on the arch-bar 9 and in practice is provided with coacting means, as a locking-dog or the like, to secure said lever to the arch-bar when the lever is disposed in any desired position.

I do not desire to limit myself to the precise construction and combination of devices hereinafter shown and described, as it is evident that modifications may be made therein without departing from the spirit of my invention and within the scope of the appended claims.

Having thus described my invention, I claim—

1. In a plow of the class described, the combination of a frame, axle-shafts carried thereby having angular elements and rocking arms, supporting-wheels carried by said angular elements, a connection between the rocking arms, and a transversely-swinging lever having an angular arm linked to the said connection, substantially as described.

2. In a plow of the class described, the combination of a frame, axle-shafts carried thereby having angular elements and rocking arms, supporting-wheels carried by said angular elements, a connection between the rocking arms, a transversely-swinging lever having an angular arm linked to the said connection, and a supplemental lever connected directly to one of the said axle-shafts, whereby, by operating the levers separately or conjunctively, said axles may be adjusted to raise and lower the frame, substantially as described.

3. In a plow of the class described, the combination of a frame, axle-shafts carried thereby, adapted for oscillating motion, and having angular members and rock-arms, supporting elements carried by said angular elements, a connecting element between the said rock-arms to cause said axle-shafts to move in unison, and a lever connected to said shafts and adapted to operate the same to raise and lower the frame, one of said axle-shafts also having a pedal-lever adapted to be operated manually simultaneously with the first-mentioned lever, substantially as described.

4. In a plow of the class described, an angularly-adjustable plow element, in combination with an angularly-adjustable draft element, and means to simultaneously adjust them, substantially as described.

5. In a plow of the class described, the combination of an angularly-adjustable plow element, an angularly-adjustable draft element, and a lever connected to said plow and draft elements and adapted to simultaneously adjust them, substantially as described.

6. In a plow of the class described, the combination of an angularly-adjustable plow element, an angularly-adjustable draft element, a lever having a connection with said draft element and an adjustable connection with said plow element, substantially as described.

7. In a plow of the character described, the combination of a frame, a pivoted angularly-adjustable draft element, an angularly-adjustable plow element, a pivoted lever connected to the draft element, and a link connecting said lever with the plow element, substantially as described.

8. In a plow of the class described, the combination of a frame, axle-shafts carried thereby and having angular portions and rocking arms, supporting-wheels carried by said angular portions, a connection between the rocking arms, a transversely-swinging lever having an angular arm linked to the said connection, and a transversely-extending arched bar secured to the frame and supporting said lever.

9. In a plow of the class described, the combination of a frame, an angularly-adjustable draft element, an angularly-adjustable plow element, a transversely-swinging pivoted lever for simultaneously adjusting said draft and plow elements, and a rigid support on the frame for said lever.

10. In a plow of the class described, the combination of a frame, an angularly-adjustable plow element, an angularly-adjustable draft element, a lever for simultaneously adjusting said elements, axle-shafts having angular portions, supporting-wheels carried by said angular portions, a second lever coaxially mounted with the draft element but adjustable independently thereof, and a connection between said lever and the axle for adjusting the latter to raise or lower the frame.

11. In a plow of the class described, the combination of a frame, a pivoted draft element having a rearwardly-extending arm, an angularly-adjustable plow element, and a transversely-swinging lever having a pivotal slip-joint connection with the arm of the draft element and a link connection with the plow element, for simultaneously angularly adjusting said elements.

12. In a plow of the class described, the combination of a frame having a stationary obliquely-disposed beam, a series of angularly-adjustable plow elements pivotally mounted upon said beam and provided with rock-arms, a connection between the arms of the several plow elements, and a pivoted transversely-swinging lever having a link-and-crank connection with one of said plow elements and a pivotal slip-joint connection with the draft element, substantially as described.

In witness whereof I have hereunto set my hand this 23d day of May, 1902.

WILLIAM H. FOX.

Witnesses:
 GEO. T. DUNLAP,
 RICH. B. TRIPP.